United States Patent [19]
Muto et al.

[11] Patent Number: 5,414,611
[45] Date of Patent: May 9, 1995

[54] SINGLE TRANSFORMER SWITCHING REGULATOR

[75] Inventors: Takanori Muto; Teruhisa Sudou, both of Tokyo, Japan

[73] Assignee: NEC Corporation, Tokyo, Japan

[21] Appl. No.: 134,270

[22] Filed: Oct. 8, 1993

[30] Foreign Application Priority Data

Oct. 12, 1992 [JP] Japan .................. 4-272167
Aug. 18, 1993 [JP] Japan .................. 5-203792

[51] Int. Cl.6 ........................................... H02M 3/335
[52] U.S. Cl. ........................................... 363/21
[58] Field of Search ................ 363/20, 21, 74, 78, 363/80, 95, 97, 131

[56] References Cited

U.S. PATENT DOCUMENTS

| | | | |
|---|---|---|---|
| 4,494,178 | 1/1985 | Ishima | 363/21 |
| 5,034,871 | 7/1991 | Okamoto et al. | 363/21 |
| 5,063,489 | 11/1991 | Inaba | 363/21 |
| 5,208,432 | 5/1993 | Han | 363/21 |
| 5,297,014 | 3/1994 | Saito et al. | 363/21 |
| 5,301,095 | 4/1994 | Teramoto et al. | 363/21 |

Primary Examiner—Thomas M. Dougherty
Assistant Examiner—Matthew V. Nguyen
Attorney, Agent, or Firm—Ostrolenk, Faber, Gerb & Soffen

[57] ABSTRACT

A switching regulator comprises a single transformer having a primary winding connected in an input circuit for receiving direct-current energy and a secondary winding connected in an output circuit, and a switching transistor connected in series with the primary winding. A high frequency pulse generator triggers the switching transistor so that it interrupts the direct-current energy at a high frequency. A rectifier is provided for converting high frequency energy developed in the secondary winding into direct-current output energy, which is maintained constant by controlling the high frequency pulse generator. A low voltage detector produces a signal when the direct-current energy in the input circuit falls below a specified value. In response to the signal from the low voltage detector, constant direct-current energy is derived from a battery and applied to the output circuit as backup power.

14 Claims, 6 Drawing Sheets

SINGLE TRANSFORMER SWITCHING REGULATOR

BACKGROUND OF THE INVENTION

1. Field of the Invention

The present invention relates generally to switching regulators, and more particularly to a switching regulator having a power backup unit.

2. Description of the Related Art

A prior art switching regulator having power backup unit comprises a first DC-DC converter for converting an input direct-current voltage to a desired level, and a second, power backup DC-DC converter for converting a direct-current voltage from a battery to the desired level. A first diode is provided for coupling the first output terminal of the first DC-DC converter to the first input terminal of the second converter, the second output terminal of the first converter being connected direct to the second input terminal of the second converter. The battery is connected through a second diode to the first input of the second converter. The output of the first converter is regulated at a level higher than the battery voltage so that under normal conditions no current is supplied from the battery to the second converter. If the output of the first converter reduces below the battery voltage, a current is supplied from the battery to the second converter via the second diode to produce a desired direct-current output voltage from the second converter, instead of from the first converter.

Since the efficiency of the prior art switching regulator during normal operation is represented by the multiplied efficiencies of the first and second converters, and since each of the converters comprises a transformer, the efficiency value is low and thus necessitated a design consideration that minimizes the power dissipation of individual components, while ensuring their safety margins. Additionally, because of the use of two transformers, the prior art switching regulator is costly, bulky, and adds extra weight to the regulator.

SUMMARY OF THE INVENTION

It is therefore an object of the present invention to provide a switching regulator which is efficient, lightweight and low cost.

According to the present invention, there is provided a switching regulator having an input circuit and an output circuit. The switching regulator comprises a single transformer having a primary winding connected in the input circuit for receiving direct-current energy and a secondary winding connected in the output circuit, and a switching element connected in series with the primary winding. A monitor circuit is connected to the output circuit for monitoring the direct-current energy in the output circuit. A high frequency pulse generator, energized by the direct-current energy in the input circuit, generates a high frequency pulse with a duty ratio inversely variable as a function the monitored direct-current energy in the output circuit. The switching element is responsive to the high frequency pulse for interrupting the direct-current energy supplied to the primary winding of the transformer. A rectifier circuit is connected in the output circuit for converting high frequency energy developed in the secondary winding into direct-current energy. A low voltage detector is provided for producing a low voltage indication signal when the direct-current energy in the input circuit falls below a specified value. In response to the low voltage indication signal, constant direct-current energy is derived from a battery and supplied to the output circuit as backup power.

According to a first specific aspect of the present invention, the constant direct-current energy is derived by a circuit comprising a second switching element connected in series with the battery across the secondary winding, and a second high frequency pulse generator energized by the direct-current energy in the output circuit for generating a high frequency pulse with a duty ratio inversely variable as a function of the direct-current energy in the output circuit detected by the monitor circuit. In the presence of the low voltage indication signal, the second switching element interrupts a current supplied from the battery in response to the high frequency pulse to generate high frequency energy in the main secondary winding. This high frequency energy is converted to direct-current energy in the output circuit by the rectifier as backup power.

According to a second specific aspect of the present invention, the transformer has an auxiliary secondary winding, and the constant direct-current energy is derived by a circuit comprising a second switching element connected in series with the battery across the main secondary winding, and a second high frequency pulse generator connected to the auxiliary secondary winding for generating a high frequency pulse with a variable duty ratio inversely proportional to the direct-current energy detected by the monitor circuit. In the presence of the low voltage indication signal, the second switching element interrupts a current supplied from the battery in response to the high frequency pulse to generate high frequency energy in the main secondary winding.

According to a third specific aspect of the present invention, a rechargeable battery is used, and the constant direct-current energy is derived by a circuit comprising a second rectifier connected to the secondary winding of the transformer for converting high frequency energy developed therein to direct-current energy, and a battery charger for receiving the direct-current energy from the second rectifier for charging the rechargeable battery. A voltage stabilizer is connected to the rechargeable battery for producing a constant direct-current voltage. In response to the low voltage indication signal, the constant direct-current voltage is applied to the output circuit of the switching regulator as backup power.

BRIEF DESCRIPTION OF THE DRAWINGS

The present invention will be described in further detail with reference to the accompanying drawings, in which.

DETAILED DESCRIPTION

Figure 1:
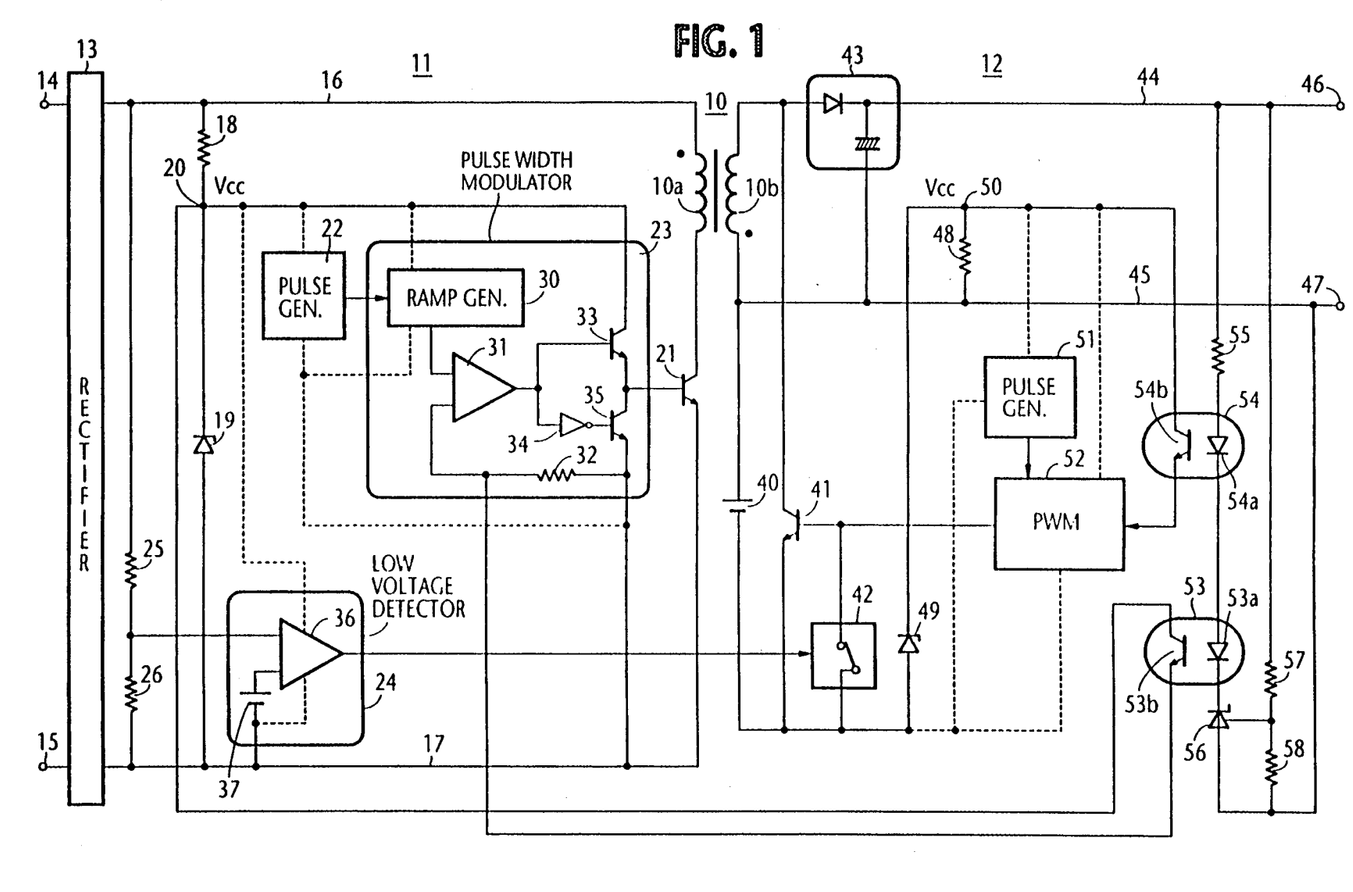
FIG. 1 is a circuit diagram, partly in block form, of a switching regulator according to the present invention, in which a constant frequency clock pulse source is used in the output circuit of the switching regulator in the same manner as in its input circuit.

Referring now to the drawings in which corresponding parts are marked with same reference numerals and have identical significances throughout the drawings. As represented in FIG. 1, a switching regulator according to a first embodiment of the present invention generally comprises an input circuit 11 and an output circuit 12 and a single transformer 10 for inductively coupling the input circuit 11 to the output circuit 12. The input circuit 11 includes a full-wave rectifier 13 in which the mains AC voltage at input terminals 14, 15 are converted to a DC voltage which appears across power lines 16 and 17 to which the primary winding 10a of transformer 10 is connected in series with a switching transistor 21. A voltage divider is coupled across the power lines 16 and 17 to produce an operating voltage Vcc at a circuit junction 20 between a resistor 18 and a Zener diode 19. A pulse generator 22, powered by the voltage Vcc as indicated by dotted lines, supplies clock pulses at a frequency, typically 100 kHz, to a pulse width modulator 23 in which the width, or duty ratio, of the clock pulse is modulated in accordance with a signal supplied from a photocoupler 53.

Specifically, the pulse width modulator 23 includes a ramp generator 30 which generates a ramp voltage in response to each clock pulse from the pulse generator 22. A comparator 31 compares the instantaneous value of the ramp voltage with a variable reference voltage developed across a resistor 32 to which the output of the photo-coupler 53 is connected. Comparator 31 produces an output signal at one of two values depending on whether it is higher or lower than the reference voltage, so that the output signal of comparator 31 is in the form of a pulse whose duty ratio is inversely proportional to the voltage developed across the resistor 32. Transistors 33 and 34 are connected in series between the circuit junction 20 and power line 17 and their emitter-collector junction is connected to the base of switching transistor 21. The output of comparator 31 directly drives the transistor 33 or via an inverter 34 drives the transistor 35 to turn on the switching transistor 21 for a duration proportional to the duty ratio of the output pulse of comparator 31. In response, a current pulse is generated in the primary winding 10a, storing magnetic energy therein. During a subsequent turn-off time of switching transistor 21, the energy stored in the primary winding 10a is discharged and transferred to the secondary winding 10b, causing a transient high voltage to develop thereacross.

The input circuit 11 further includes a low voltage detector 24 for detecting when the input AC voltage is lower than the rated value by means of a comparator 36 which compares a voltage that is developed at a junction between resistors 25 and 26 connected across lines 16, 17 with a reference voltage supplied from a battery 37 representing the rated input voltage of the switching regulator, and generates a low voltage indication signal when Vcc is lower than the reference value.

The output circuit 12 includes a battery 40 for the emergency power backup purpose. The positive terminal of battery 40 is connected to the lower end of the secondary winding 10b and the negative terminal thereof connected through a switching transistor 41 to the upper end of the secondary winding 10b so that when the switching transistor 41 is turned on a current is supplied from the battery 40 to the secondary winding 10b. A normally closed switch 42 is in shunt with the base and emitter of the switching transistor 41. Switch 42 opens its contact in response to the low voltage indication signal from detector 24. Transistor 41 is thus usually disabled when the input AC voltage is equal to or higher than the rate value. A rectifier 43 is connected to the secondary winding 10b of transformer 10 to produce a DC output voltage across power lines 44 and 45 which lead to output terminals 46 and 47, respectively.

Across the power lines 44, 45 is connected a voltage divider to produce a DC operating voltage Vcc at a circuit junction 50 between a resistor 48 and a Zener diode 49 connected between line 45 and the negative terminal of battery 40. In a manner similar to the input circuit 11, a pulse generator 51 and a pulse width modulator 52 are provided in the output circuit 12, both of which are powered by the voltage Vcc at junction 50. Similar to the pulse width modulator 23, the pulse width modulator 52 modulates the width of the pulse from pulse generator 51 in accordance with the output of a photo-coupler 54 and applies its output to the base of switching transistor 41.

In order to supply a control voltage to the pulse width modulators 23 and 52, the light emitting diodes 53a, 54a of photo-couplers 53, 54 are connected in series across the output terminals 46, 47 with a resistor 55 and a shunt regulator 56 which is biased with a reference voltage developed at a junction between resistors 57 and 58. The phototransistor 53b of photocoupler 53 has its collector coupled to the circuit junction 20 and its emitter to the resistor 32 of pulse width modulator 23. The phototransistor 54b of photo-coupler 54 has its collector coupled to the circuit junction 50 and its emitter to the pulse width modulator 52.

The shunt regulator 56 controls the amount of current supplied to the light-emitting diodes 53a and 54a in response to a voltage variation that occurs in the DC output voltage across the output terminals 46, 47, and the impedances of photo-transistors 53b and 54b are caused to vary with such variation, and in proportion to which there is a corresponding variation in the voltage developed across the resistor 32.

When the mains AC voltage is equal to or higher than the rated value, the low voltage detector 24 produces no output, the switch 42 remains closed and the switching transistor 41 is not allowed to respond to the output of pulse width modulator 52. Under this normal condition, the DC input from rectifier 13 is chopped by switching transistor 21 at the frequency of the pulse generator 22 and converted to high frequency energy. This high frequency energy is transferred by transformer 10 from the input circuit 11 to the output circuit 12 and converted to DC energy by rectifier 43 for delivery to the output terminals 46, 47. In response to the feedback signal from photo-coupler 53, the pulse width modulator 23 produces a pulse whose duty ratio varies inversely as a function of a variation in the DC output voltage across terminals 46 and 47 so that the DC output voltage is kept constant. This DC voltage is divided by resistor 48 and Zener diode 49 to produce the operating voltage for energizing the pulse generator 51 and pulse width modulator 52 in preparation for a possible power failure.

If the input AC voltage reduces below the rated value, the low voltage detector 24 generates a low voltage indication signal to open the circuit of switch 42 and the switching transistor 41 is now allowed to respond to the output of the pulse width modulator 52. When the switching transistor 41 is turned on, a current pulse is supplied from the battery 40 to the secondary winding 10b and when it is subsequently turned off a voltage is developed in the secondary winding 10b by counter-electromotive force, and the process is repeated as long as the switch 42 is open to generate high frequency energy in the secondary winding 10b. This high frequency energy is converted to DC voltage by the rectifier 43 for delivery to the output terminals 46, 47 as in the case of normal operations. In response to the feedback signal from photo-coupler 54, the pulse width modulator 52 produces a pulse whose duty ratio varies inversely as a function of the DC output voltage across terminals 46 and 47 to keep it constant as in the case of normal operation. During this abnormal condition, the pulse generator 51 and pulse width modulator 52 are powered by the rechargeable battery 71.

Figure 2:
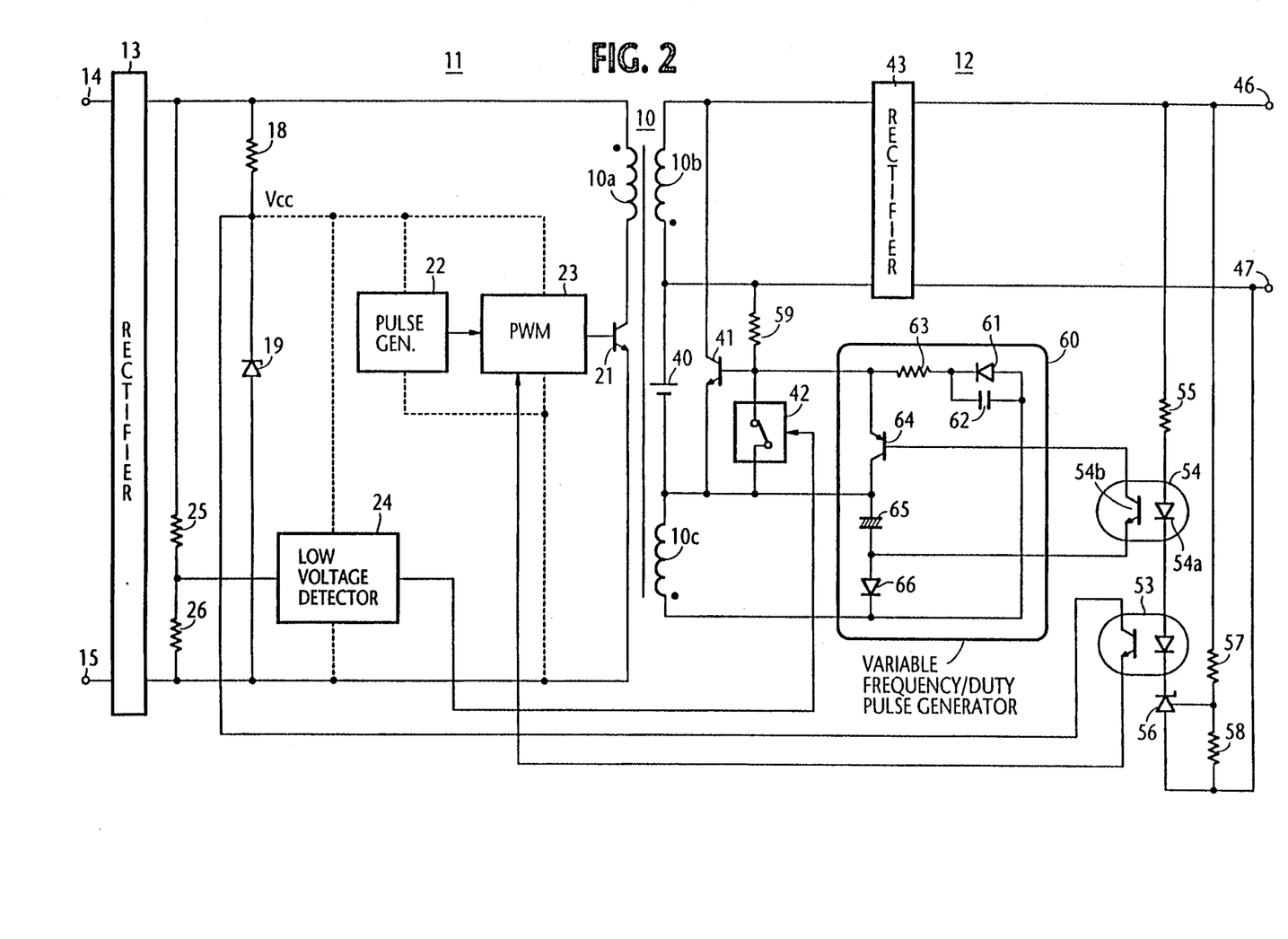
FIG. 2 is a circuit diagram of a modification of the switching regulator of FIG. 1, in which a self-oscillating pulse generator is used in the output circuit.

A modified embodiment of the present invention is shown in FIG. 2. This modification differs from the previous embodiment in that the transformer 10 has an auxiliary (feedback) secondary winding 10c having the upper end thereof connected to the negative terminal of battery 40, and that a variable frequency/duty pulse generator 60 is provided, instead of the pulse generator 51 and pulse width modulator 52 of FIG. 1. Pulse generator 60 takes its energy from the winding 10c and comprises a parallel circuit of a diode 61 and a capacitor 62, connected to the lower end of the auxiliary secondary winding 10c, and a resistor 63 connected between the parallel diode-capacitor combination and the base of the switching transistor 41. A transistor 64 is provided in the pulse generator 60 such that its emitter and collector are connected to the base and emitter of switching transistor 41, respectively, and its base is connected to the collector of photo-transistor 54b. Across the feedback secondary winding 10c is connected a series circuit of a capacitor 65 and a diode 66 which allows current to flow from the upper end of winding 10c through capacitor 65 to the lower end of the winding. The junction between capacitor 65 and diode 66 is connected to the emitter of photo-transistor 54b.

The normal operation of the switching regulator of FIG. 2 is the same as the previous embodiment. During a low input voltage condition, the switch 42 is open in response to the low voltage indication signal from low voltage detector 24, and the base of switching transistor 41 is supplied with a small current that flows from battery 40 through resistor 59. This triggers the transistor 41 into conduction, causing a current to be supplied from battery 40 to the main secondary winding 10b. Because of the inductive coupling, a voltage is induced in the feedback winding 10c in response to the current pulse in the main secondary winding 10b. The lower end of the winding 10c is driven to a potential higher than its upper end and the diode 61 is biased forward to turn on the transistor 64. The turn-on of transistor 64 causes the switching transistor 41 to turn off so that the current from the battery 40 ceases to exist. Upon termination of the current, the lower end of the winding 10c is driven to a potential lower than its upper end and the diode 61 is backward biased to allow transistor 64 to turn off, while diode 66 is forward biased to store energy into capacitor 65. Capacitor 62, which stores energy during the on-state of transistor 64, now discharges the stored energy to allow the transistor 64 to be rapidly turned off, while capacitor 65 is developing a voltage that assists the transistor 64 to reduce the period of transition from the turn-on to the turn-off state. Transistor 64 remains turned off, allowing the switching transistor 41 to turn on again with the result that a subsequent current is produced in the main winding 10b and a corresponding voltage is induced in the auxiliary winding 10c. The above process is repeated and transistor 64 is turned on and off as long as the low voltage condition prevails. The turn-off period of transistor 64 as well as its on-off rate, and hence the frequency and duty ratio of the pulse produced by the pulse generator 60 are determined by the variable impedance of photo-transistor 54b that is connected between the base of transistor 64 and the capacitor 65, so that the amount of AC energy supplied to the main secondary winding 10b is inversely proportional to the DC output voltage developed across terminals 46, 47.

Figure 3:
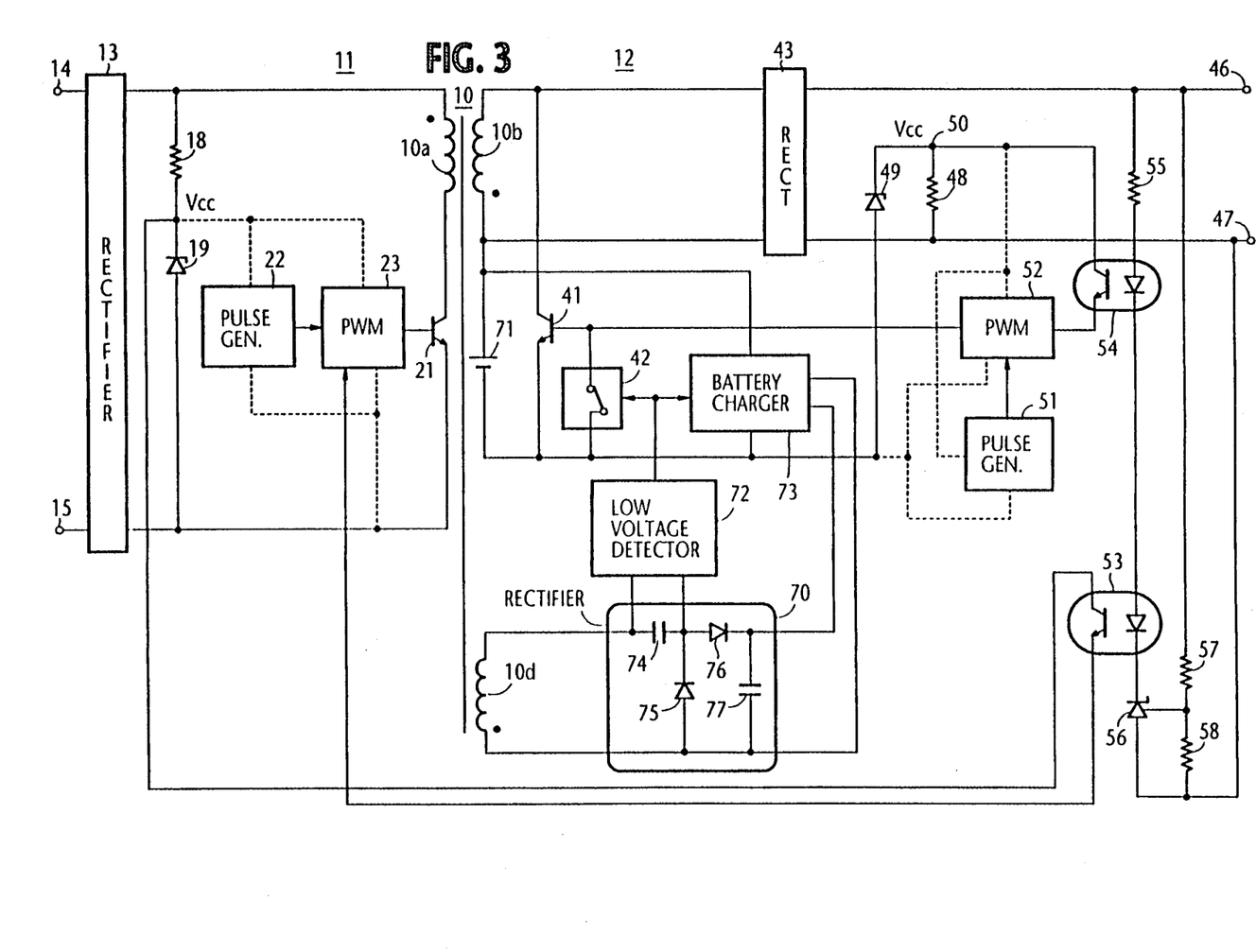
FIG. 3 is a circuit diagram of a further modification of the switching regulator of FIG. 1, in which a rechargeable battery is used as a backup power source and recharged by the use of an additional secondary winding.

A further modification of the embodiment of FIG. 1 is shown in FIG. 3. According to this modification, a rechargeable battery 71 is used as a backup power source in combination with the clock driven pulse width control scheme of FIG. 1. As illustrated, the transformer 10 has an auxiliary secondary winding 10d which is used as a source for charging the battery 71 when the switching regulator is supplied with the rated AC voltage. A rectifier 70 of voltage-doubler configuration is connected to the auxiliary secondary winding 10d. Rectifier 70 is comprised by a capacitor 74 and a diode 75 connected in series across the winding 10d to develop a voltage in capacitor 74 when the lower end of winding 10d is driven to a positive potential. Across the diode 75 is connected a series of a diode 76 and a capacitor 77 to allow the energy stored on capacitor 74 to be discharged through diode 76 into capacitor 77 when the upper end of winding 10d is driven to a positive potential. The voltage developed in capacitor 77, which is twice as high as the voltage across capacitor 74. The voltages developed in capacitors 74 and 77 are respectively applied to a low voltage detector 72 and a battery charger 73. When the mains AC voltage at the input terminals 14, 15 is higher than the rated value, the voltage across capacitor 74 is higher than a specified threshold, and no output is produced by the low voltage detector 72 and the switch 42 remains closed. During this normal operation, battery charger 73 is supplied with sufficient DC energy from rectifier 70 to charge the battery 71 in preparation for possible power failures. The low-voltage indication signal from the low voltage detector 72 is also applied to the battery charger 73 as a disabling signal to cause it to stop its charging operation.

If the mains AC voltage becomes lower than the rated value, the voltage across capacitor 74 becomes lower than the specified threshold, and the low voltage detector 72 generates a low voltage indication signal to open the switch 42, allowing the transistor 41 to respond to the output of pulse width modulator 52 and successively feeding a current from battery 71 to the secondary winding 10b and the battery charger 73 ceases its charging operation.

Figure 4:
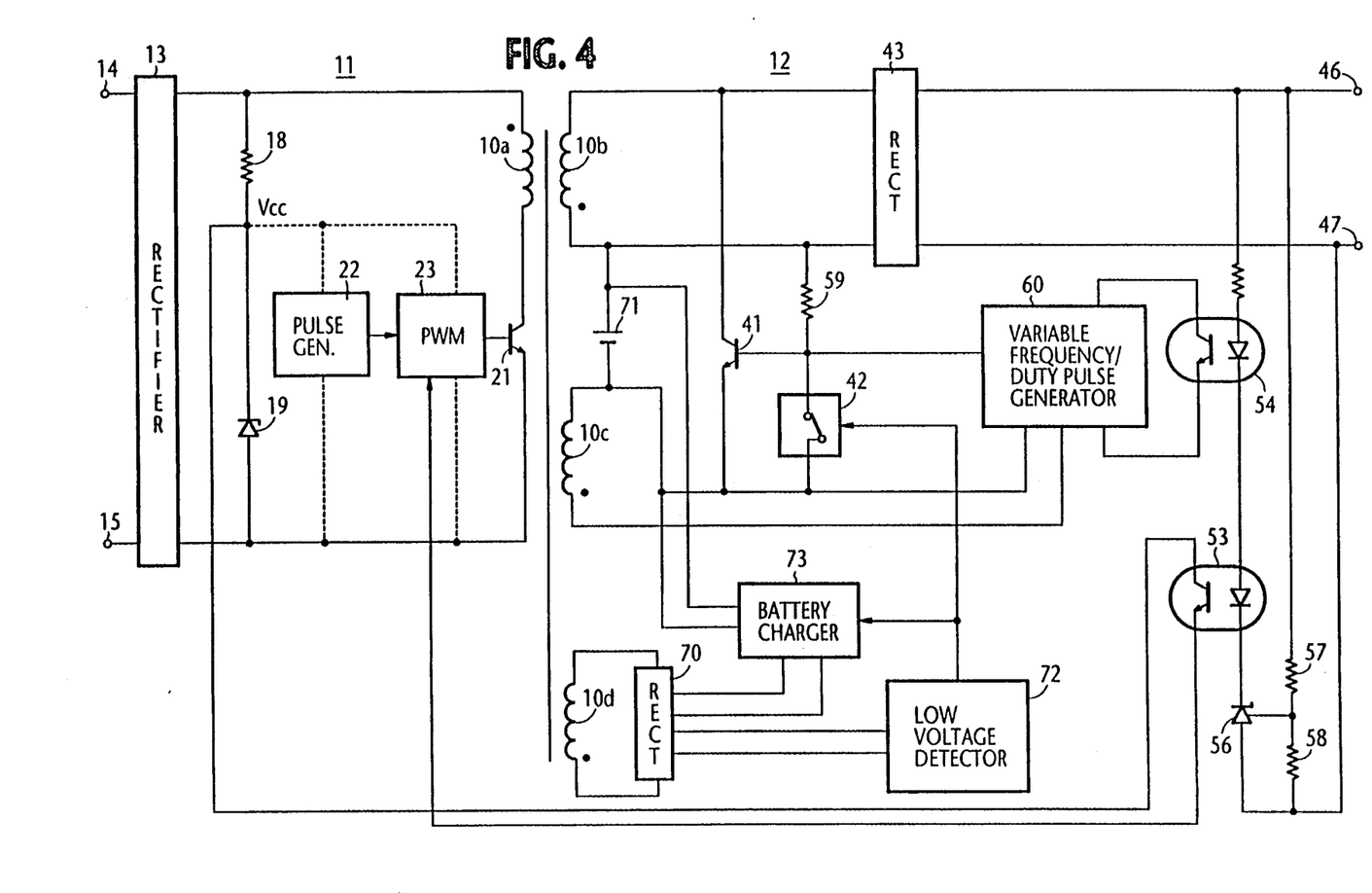
FIG. 4 is a circuit diagram of a modification of the switching regulator of FIG. 3, in which the rechargeable battery is used in combination with the self-oscillating pulse generator of FIG. 2 using an additional secondary winding.

The embodiment of FIG. 3 is modified as shown in FIG. 4, in which the variable frequency/duty pulse generator 60 of FIG. 2 is used instead of the clocked pulse width modulation circuitry of FIG. 3 by additionally coupling the feedback secondary winding 10c at one end to the rechargeable battery 71 and further coupling it at opposite ends to the variable frequency/duty pulse generator 60 in the same manner as in FIG. 2. The operation of this embodiment is the same as of the self-oscillation of FIG. 2 combined with the battery charging of FIG. 3.

Figure 5:
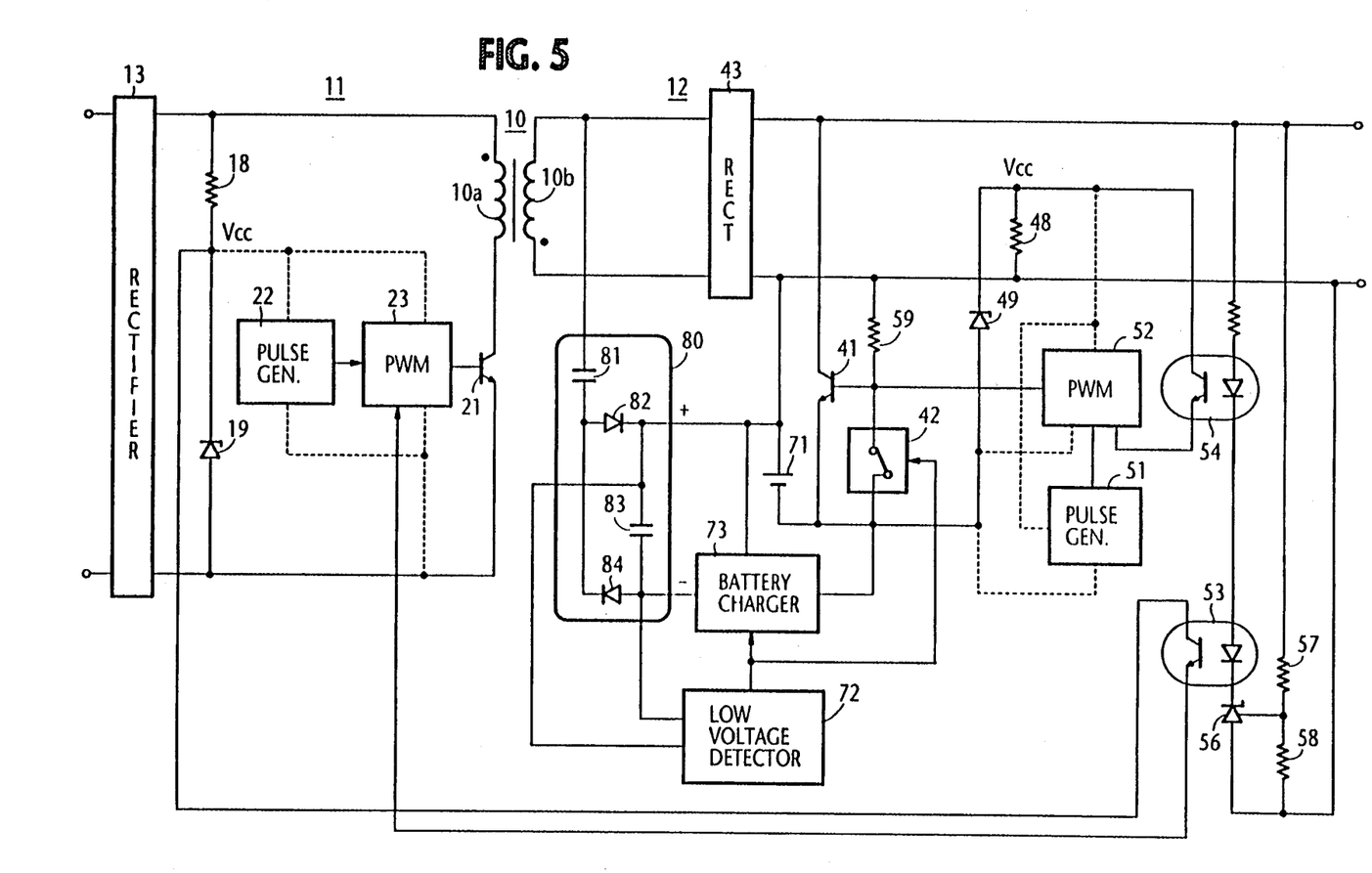
FIG. 5 is a circuit diagram of a further modification of the switching regulator of FIG. 3, in which the rechargeable battery is used in combination with the clocked pulse width modulation of FIG. 1, using a rectifier connected to the main secondary winding.

A further modification of the embodiment of FIG. 3 is shown in FIG. 5 in which the transformer 10 has a single secondary winding 10b. In this embodiment, the transformer 10 is designed to deliver sufficient power to the battery charger 73. A rectifier 80 of voltage-doubler configuration is connected across the secondary winding 10b and the clocked pulse width modulation of FIG. 1 is employed. The rectifier 80 comprises a series of a capacitor 81 and a diode 82 connected across the secondary winding 10b, and a series of a capacitor 83 and a diode 84 connected in shunt with the diode 82. When the upper end of winding 10b is driven positive, the diode 82 is forward biased to cause a current to flow through capacitor 81 to the lower end of winding 10b. When the latter is driven positive, the diode 84 is forward biased, producing a current that flows through capacitor 83, diode 84 and capacitor 81 to the upper end of winding 10b. A voltage twice as high as that developed in the winding 10b is stored in capacitor 83. The battery charger 73 is connected in series to the negative power output line of the rectifier 80. Since it is necessary to directly couple the positive output line of the rectifier 80 to the secondary winding 10b, the battery charger 73 is positively grounded. The voltage across the capacitor 83 is applied to the low voltage detector 72 as a representative of the AC input voltage.

Figure 6:
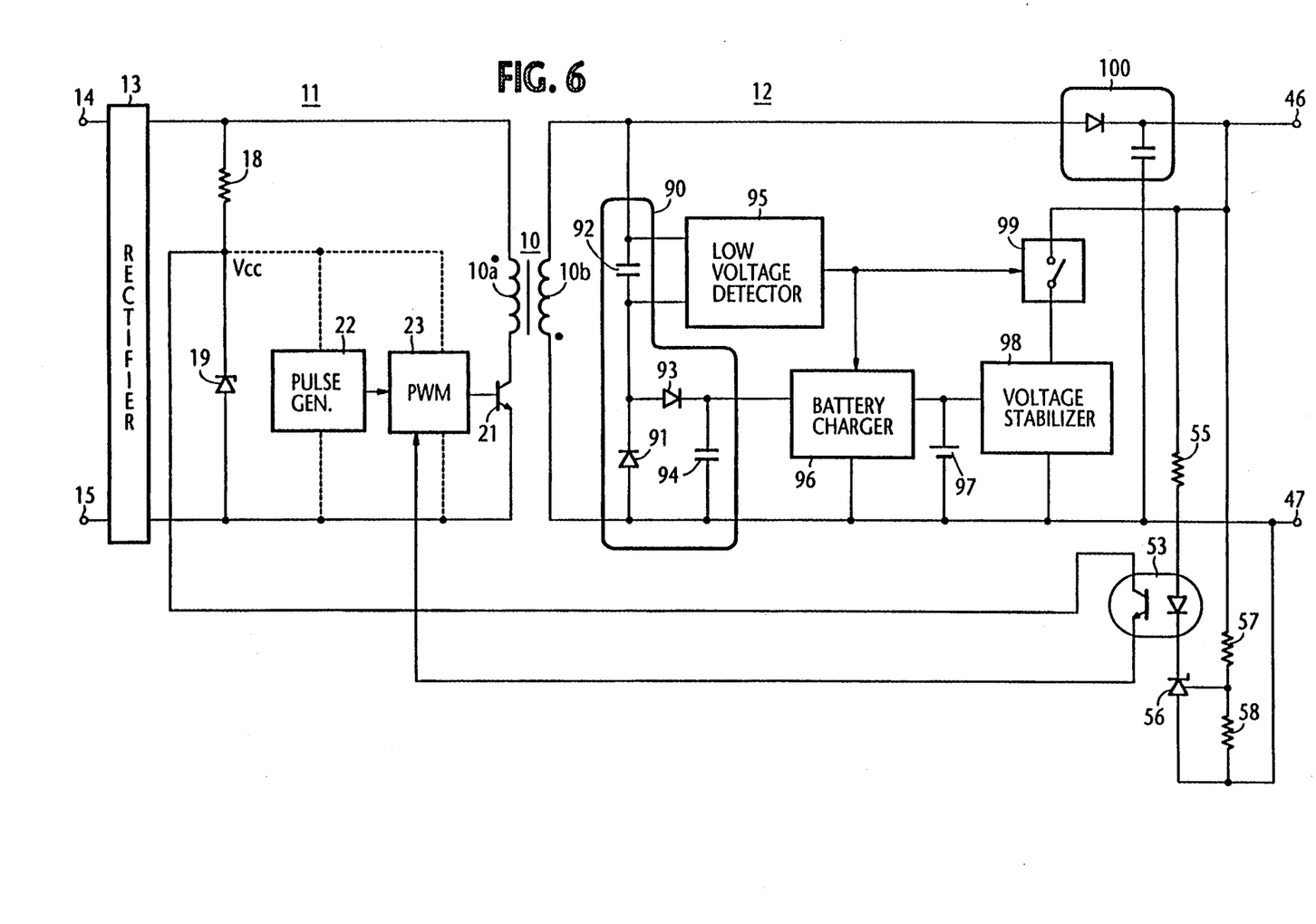
FIG. 6 is a circuit diagram of a modification of the embodiment of FIG. 5, in which a single photo-coupler monitors the DC output voltage during normal operating conditions, and a voltage stabilizer supplies constant DC output voltage during power failure.

The embodiment of FIG. 5 is modified as shown in FIG. 6 in which a voltage stabilizer 98 is used, instead of the feedback circuit including the photo-coupler 54, to maintain the DC output voltage constant. Connected to the secondary winding 10b is a rectifier 90 of voltage-doubler configuration, which includes a series of diode 91 and capacitor 92 to generate a first current in the winding 10b and a series of diode 93 and capacitor 94 coupled across the diode 91 to generate a second, opposite current in the winding 10b. A low voltage detector 95 is connected across the capacitor 91 to operate a normally open power switch 99 for connecting the outputs of voltage stabilizer 98 to the output terminals 46 and 47 when a low voltage condition is detected. A battery charger 96 is powered by a voltage developed across the capacitor 94 to charge a rechargeable battery 97 whose voltage is usually maintained at a level higher than the rated value of the load circuit coupled to the output terminals 46, 47. The voltage stabilizer 98 is connected to the battery 97 to produce a constant DC voltage. A rectifier 100 is connected to the secondary winding 10b to supply a DC output voltage to the output terminals 46, 47.

Under normal operating conditions, transistor 21 is turned on and off by pulse width modulator 23 in the same manner as described in the previous embodiments, producing high frequency energy in the primary winding 10a which is transferred to the secondary winding 10b and converted by rectifier 100 into a DC voltage for delivery to the output terminals 46, 47. The same high frequency energy is converted by rectifier 90 into DC energy, and a voltage twice as high as one developed across the winding 10b appears across the capacitor 94 and energizes the battery charger 96. Rechargeable battery 97 is constantly charged in this way during normal operating conditions in preparation for power failures. The DC output voltage generated during normal operations is monitored by the photo-coupler 53 and the amount of the high frequency energy input to the primary winding 10a is controlled so that the DC output voltage is maintained constant in the same manner as in the previous embodiments.

If power failure occurs, the low voltage detector 95 produces a low voltage indication signal that closes the power switch 99 for coupling the stabilized DC voltage to the output terminals 46, 47. This low voltage indication signal is also applied to the battery charger 96 as a disabling signal to cause it to stop charging the battery 97.

What is claimed is:

1. A switching regulator having an input circuit for receiving direct-current energy and an output circuit, comprising:

a single transformer having a primary winding connected in said input circuit for receiving direct-current energy and a secondary winding connected in said output circuit;

monitor means for monitoring direct-current energy in said output circuit;

a first switching element connected in said input circuit in series with said primary winding;

first high frequency pulse generator means energized by the direct-current energy of said input circuit for producing first high frequency pulse and causing said first switching element to interrupt said direct-current energy of said input circuit in response to the first high frequency pulse, said first high frequency pulse having a duty ratio inversely variable as a function of the direct-current energy monitored by said monitor means;

rectifier means connected in said output circuit for converting high frequency energy developed in said secondary winding into said direct-current energy of said output circuit;

low voltage detector means for producing a low voltage indication signal when said direct-current energy of said input circuit falls below a specified value;

a battery connected to the secondary winding of said transformer; and means connected to said battery for deriving constant direct-current energy from said battery and coupling the constant direct-current energy to said output circuit in response to said low voltage indication signal, said means for deriving comprising;

a second switching element connected in series with said battery across said secondary winding; and second high frequency pulse generator means energized by the direct-current energy of said output circuit for generating a second high frequency pulse with a variable duty ratio and causing said second switching element to interrupt a current supplied from said battery in response to the second high frequency pulse in the presence of said low voltage indication signal, the duty ratio of the second high frequency pulse being inversely proportional to the direct-current energy monitored by said monitor means.

2. A switching regulator as claimed in claim 1, wherein the first-mentioned secondary winding is a main secondary winding, and said transformer has an auxiliary secondary winding and said battery is a rechargeable battery which is connected between, said main secondary winding and said auxiliary secondary winding, further comprising:
   second rectifier means connected to said auxiliary secondary winding for producing direct-current energy; and
   a battery charger for receiving the direct-current energy from the second rectifier means and charging said rechargeable battery.

3. A switching regulator as claimed in claim 1, wherein said battery is a rechargeable battery, further comprising:
   second rectifier means connected to said secondary winding for producing direct-current energy; and
   a battery charger for receiving the direct-current energy from the second rectifier means and charging said rechargeable battery.

4. A switching regulator as claimed in claim 1, wherein the first-mentioned secondary winding is a main secondary winding, and said transformer has an auxiliary secondary winding, and wherein said battery is connected between said main secondary winding and said auxiliary secondary winding, and said second high frequency pulse generator means is connected to said auxiliary secondary winding for receiving energy therefrom.

5. A switching regulator as claimed in claim 4, wherein said transformer has a second auxiliary secondary winding and said battery is a rechargeable battery further comprising:
   second rectifier means connected to said second auxiliary secondary winding (10d) for producing direct-current energy; and
   a battery charger for receiving the direct-current energy from the second rectifier means and charging said rechargeable battery.

6. A switching regulator as claimed in any of claims 2, 3, and 4, wherein said low voltage detector means is connected to said second rectifier means.

7. A switching regulator as claimed in claim 1, wherein said monitor means comprises:
   a first photo-coupler having a light emitting diode and a phototransistor; and
   a second photo-coupler having a light emitting diode and a phototransistor,
   the light emitting diodes of the first and second photo-couplers being connected in series to said output circuit, and the photo-transistor of the first photo-coupler receiving direct-current energy from the input circuit and being connected to the first high frequency pulse generator means as a variable impedance element, and the photo-transistor of the second photo-coupler receiving direct-current energy from the output circuit and being connected to the second high frequency pulse generator means as a variable impedance element.

8. A switching regulator as claimed in claim 2, wherein the second rectifier means comprises:
   a first rectifier circuit having a first capacitor and a first diode connected in series across said auxiliary secondary winding; and
   a second rectifier circuit having a second capacitor and a second diode connected in series across said first diode and applying a voltage developed in said second capacitor to said battery charger.

9. A switching regulator as claimed in claim 3, wherein the second rectifier means comprises:
   a first rectifier circuit having a first capacitor and a first diode connected in series across said secondary winding; and
   a second rectifier circuit having a second capacitor and a second diode connected in series across said first diode and applying a voltage developed in said second capacitor to said battery charger.

10. A switching regulator as claimed in claim 5, wherein the second rectifier means comprises:
    a first rectifier circuit having a first capacitor and a first diode connected in series across said second auxiliary secondary winding; and
    a second rectifier circuit having a second capacitor and a second diode connected in series across said first diode and applying a voltage developed in said second capacitor to said battery charger.

11. A switching regulator having an input circuit for receiving direct-current energy and an output circuit, comprising:
    a single transformer having a primary winding connected in said input circuit for receiving direct-current energy and a secondary winding connected in said output circuit;
    monitor means for monitoring direct-current energy in said output circuit;
    a first switching element connected in said input circuit in series with said primary winding;
    first high frequency pulse generator means energized by the direct-current energy of said input circuit for producing first high frequency pulse and causing said first switching element to interrupt said direct-current energy of said input circuit in response to the first high frequency pulse, said first high frequency pulse having a duty ratio inversely variable as a function of the direct-current energy monitored by said monitor means;
    first rectifier means connected in said output circuit for converting high frequency energy developed in said secondary winding into said direct-current energy of said output circuit;
    low voltage detector means for producing a low voltage indication signal when said direct-current energy of said input circuit falls below a specified value;
    a rechargeable battery;
    a second rectifier means connected to said secondary winding for converting high frequency energy developed therein to direct-current energy;
    a battery charger for receiving direct-current energy from the second rectifier means and charging said rechargeable battery;
    a stabilizer connected to said rechargeable battery and producing a constant direct-current energy; and
    means for applying said constant direct-current energy to said output circuit in response to said low voltage indication signal.

12. A switching regulator as claimed in claim 11, wherein the second rectifier means comprises:
    a first rectifier circuit having a first capacitor and a first diode connected in series across said secondary winding; and a second rectifier circuit having a second capacitor and a second diode connected in series across said first diode and applying a voltage developed in said second capacitor to said battery charger.

13. A switching regulator as claimed in claim 11, wherein said low voltage detector means is connected to said rectifier means.

14. A switching regulator as claimed in claim 11, wherein said monitor means comprises:

a first photo-coupler having a light emitting diode and a photo-transistor; and a second photo-coupler having a light emitting diode and a photo-transistor, the light emitting diodes of the first and second photo-couplers being connected in series to said output circuit, and the photo transistor of the first photo-coupler receiving direct-current energy from the input circuit and being connected to the first high frequency pulse generator means as a variable impedance element, and the photo-transistor of the second photocoupler receiving direct-current energy from the output circuit and being connected to the second high frequency pulse generator means as a variable impedance element.

* * * * *